May 25, 1971     A. S. KING     3,580,836

TREATMENT SYSTEM WITH COOLING MEANS

Filed April 8, 1969

INVENTOR.
Arthur S. King

BY
Schmidt, Johnson, & Hovey.
Williams & Chase.
ATTORNEYS.

United States Patent Office 3,580,836
Patented May 25, 1971

3,580,836
TREATMENT SYSTEM WITH COOLING MEANS
Arthur S. King, 1710 Baltimore,
Prairie Village, Kans. 64105
Continuation-in-part of application Ser. No. 727,835,
May 9, 1968. This application Apr. 8, 1969, Ser.
No. 814,279
Int. Cl. B01d 13/02
U.S. Cl. 204—308                    12 Claims

ABSTRACT OF THE DISCLOSURE

A fluid is subjected to an electrostatic field between an inner and an outer electrode. By use of a cooling system through the inner electrode, a dielectric on the inner electrode is protected against the delectrious effects of the treated fluid when the latter is heated.

---

Figure 1:
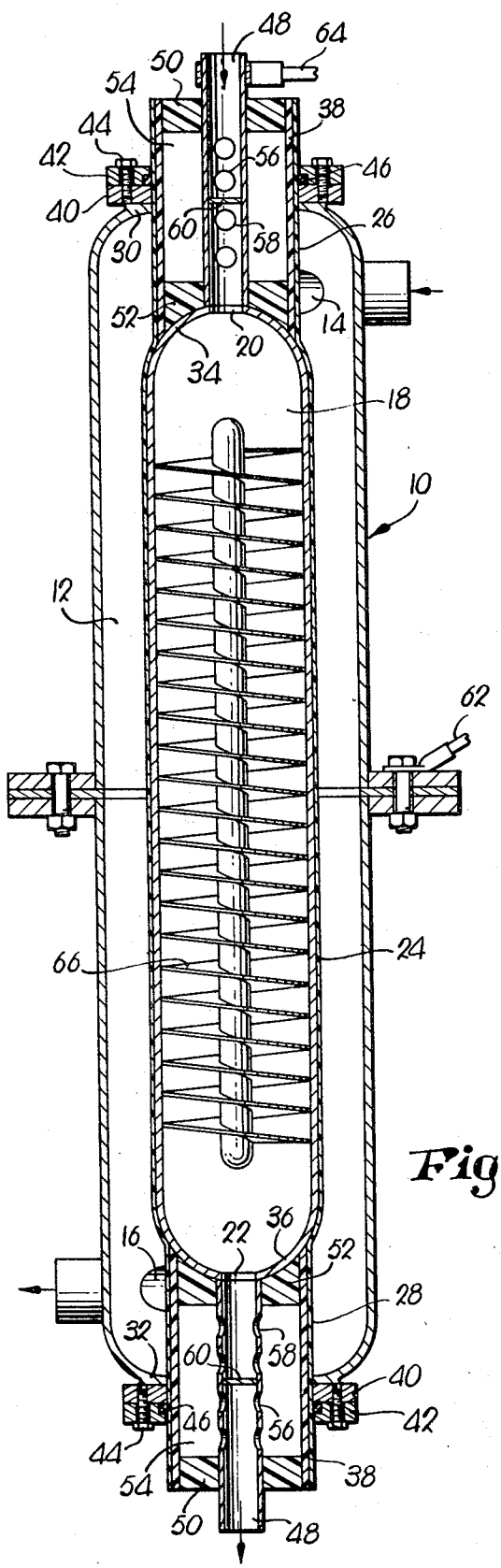

This is a coninuation-in-part of my copending application Ser. No. 727,835 filed May 9, 1968, and entitled "Treatment of Fluids With Electric Fields."

It is the object of my present invention to provide for effective cooling of apparatus for electrically treating heated fluid wherein is included a dielectric which requires protection from the heat of the fluid being treated.

Another object of the instant invention is the provision of a cooling system for a fluid treater which will not adversely affect the electrostatic field of the treater or the function, operation and effectiveness of such field.

Still another object of the present invention is to provide a cooling system which effectively utilizes the component parts of the treater to receive and discharge the coolant as well as to absorb the heat without need for expensive and complicated additional parts and equipment.

Figure 2:
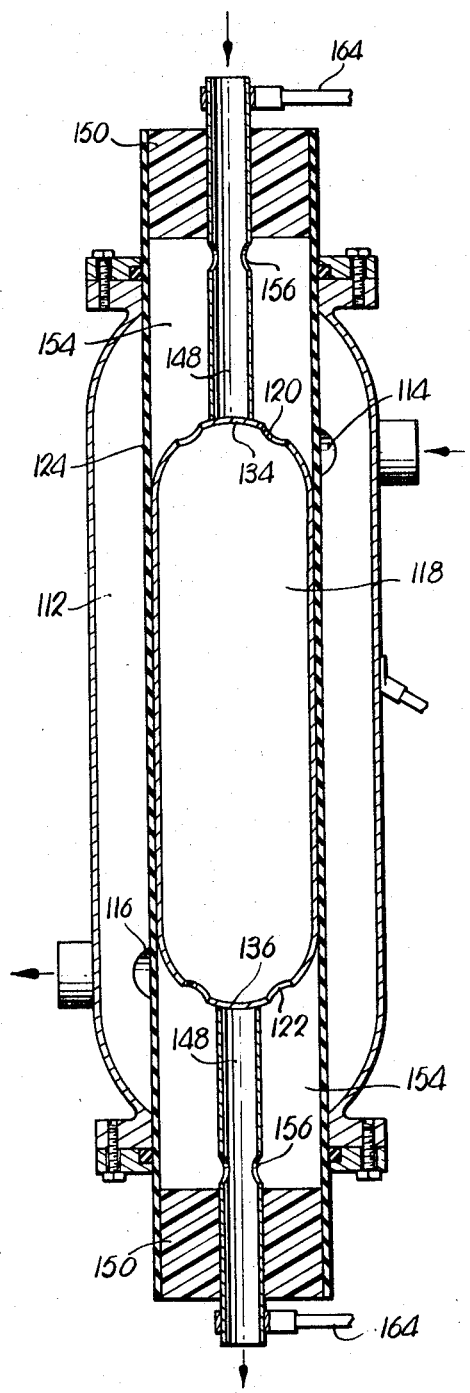

In the drawing:

FIG. 1 is a longitudinal cross-sectional view through apparatus for treating fluid having a cooling system made pursuant to one form of my present invention; and FIG. 2 is a longitudinal cross-sectional view similar to FIG. 1 illustrating a slight modification of the instant invention.

In FIG. 1 of the drawing, apparatus for electrically treating a fluid is broadly designated by the numeral 10. Apparatus 10 includes an elongated, outer tubular electrode 12 having an inlet port 14 at one end thereof for fluid, such as water, to be treated and an outlet port 16 for such fluid at the opposite end of the electrode 12.

An elongated, inner tubular electrode 18 is entirely housed with the electrode 12, extends longitudinally of the latter and is spaced throughout from the electrode 12. In the apparatus 10 chosen for illustration, electrodes 12 and 18 are both transversely cylindrical and, as illustrated, they are in coaxial relationship throughout their longitudinal axes.

The inner electrode 18 has an inlet opening 20 at one end therof for a coolant and an outlet opening 22 at its opposite end for such coolant. The electrode 18 has an elongated tubular dielectric 24 thereon, the dielectric 24 being provided with cylindrical extensions 26 and 28 that project through the ends of the electrode 12.

It is important, as set forth in my copending application above identified, that the ends 30 and 32 of electrode 12 which receive the extensions 26 and 28 respectively be dome-shaped as illustrated in FIG. 1, complementally with the dome-shaped ends 34 and 36 of electrode 18 having openings 20 and 22 respectively.

Electrode 18 is provided with cylindrical dielectric sleeves 38 within the extensions 26 and 28 that are rigidly secured to the ends 34 and 36 of electrode 18 in concentric relationship to the openings 20 and 22 and terminating flush with the outer ends of the extensions 26 and 28.

Means is provided around the extensions 26 and 28 at each of the ends 30 and 32 of electrode 12 exteriorly of the latter for sealing the fluid to be treated within the electrode 12 and flowing from the port 14 to the port 16. Each such sealing means includes a pair of rings 40 and 42 surrounding the extensions 26 and 28, the rings 40 being rigid to the ends 30 and 32 of electrode 12 and the rings 42 being attached to the rings 40 by a plurality of fasteners 44. Rings 42 thereby retain and clamp an O-ring 46 to the extensions 26 and 28 therearound.

Feeding means for directing a coolant to the opening 20 and discharge means for directing such coolant away from the opening 22 each take the form of elongated conduits 48 extending into the extensions 26 and 28 with the inner ends of the conduits 48 rigidly secured to the ends 34 and 36 of electrode 18 in direct communication with openings 20 and 22.

Sealing plugs 50 and 52, made from a material that is a nonconductor of direct electric current, are spaced apart within the sleeves 38 to present chambers 54 for receiving the coolant. The plugs 50 and 52 surround the conduits 48 and are adhesively attached thereto as well as to the sleeves 38, the plugs 52 also being adhesively bonded to the ends 34 and 36 of the electrode 18.

Conduits 48 are provided with holes 56 and 58 which communicate with chambers 54 and which are separated by partitions 60 within the conduits 48.

Means for oppositely charging the electrodes 12 and 18 to establish an electric field therebetween includes conductors 62 and 64 coupled with electrodes 12 and 18 respectively for connecting the latter across a source of direct potential, the conductor 64 being coupled with one of the conduits 48 exteriorly of the extension 26.

A spiral fin 66 extending longitudinally of the electrode 18 therewithin is provided for the purpose of evenly distributing the coolant as the latter flows through the electrode 18 from the opening 20 to the opening 22.

In operation, the fluid to be treated passes through electrode 12 from inlet 14 to the outlet 16 in surrounding relationship to the dielectric 24 and is subjected to the electric field between the electrodes 12 and 18 when the conductors 62 and 64 are connected across a source of direct potential. At the same time, if fluid being treated has been heated to a temperature such as to break down or otherwise have a deleterious effect upon the dielectric 24, such heat is absorbed by the refrigerant flowing through the electrode 18, thereby protecting the dielectric 24. The refrigerant entering the inlet 20 flows from the feeder conduit 48 through the holes 56, thence into the chamber 54 of extension 26, and then from such chamber 54 back into the corresponding conduit 48 by way of holes 58. The same action takes place at the discharge conduit 48, filling the chamber 54 that is surrounded by the extension 28. Accordingly, the refrigerant maintains the extensions 26 and 28, the sleeves 38 and the conduits 48 cooled during operation whereby the extensions 26 are likewise protected against breakdown from the fluid being treated within the electrode 12.

In the modification illustrated by FIG. 2, dielectric 124 has refrigerant receiving chambers 154 between plugs 150 and the ends 134 and 136 of electrode 118. Conduits 148 are provided with holes 156 which communicate with chambers 154 and the ends 134 and 136 of electrode 118 are provided with inlet and outlet openings 120 and 122 respectively communicating directly with the chambers 154. The dielectric 124 is made from quartz, permitting the treatment of fluid passing through electrode 112 whose temperatures range as high as 300° F. whereas it is contemplated in the modification of FIG. 1 that the temperature of the fluid being treated will range around 212° F. but below 300° F., thereby permitting a rather wide selection of material for the dielectric 24.

In FIG. 2 also a pair of conductors 164 for the electrode 118 is provided on the conduits 148 for assurances that the electrode 118 has an electric charge during treatment of the fluid flowing from inlet port 114 to outlet port 116. Otherwise the modification of FIG. 2 and its operation is essentially the same as the form of my invention shown in FIG. 1.

Manifestly, the nature of the cooling fluid to be used with the treaters is of no consequence; it may be either in a liquid form or a gas such as is commonly used in a conventional compressor-condenser-evaporator system.

Having thus described the invention, what is claimed as new and desired to be secured by Letters Patent is:

1. Apparatus for electrically treating a first fluid comprising:
    an elongated, outer tubular electrode having an inlet port at one end thereof for fluid to be treated and an outlet port at the opposite end thereof for said fluid;
    an elongated, inner tubular electrode housed entirely within the outer electrode, spaced therefrom and extending longitudinally thereof,
    said inner electrode having an inlet opening at one end thereof for a cooling fluid and an outlet opening at the opposite end thereof for said cooling fluid;
    an elongated tubular dielectric on said inner electrode and extending through said ends of the outer electrode;
    means for oppositely charging said electrodes to establish an electric field therebetween, including conductors coupled with the electrodes for connecting the same across a source of direct potential;
    feeding means for directing said cooling fluid to said inlet opening; and
    discharge means for directing said cooling fluid away from said outlet opening.

2. Apparatus as set forth in claim 1 wherein one of said conductors is coupled with one of said conduits exteriorly of the dielectric.

3. Apparatus as set forth in claim 1 wherein is provided means around the dielectric at each end respectively of the outer electrode exteriorly of the latter for sealing the first fluid within the outer electrode.

4. Apparatus as set forth in claim 1 wherein said inner electrode is provided with means therein for evenly distributing the cooling fluid as the latter flows through the inner electrode.

5. Apparatus as set forth in claim 1 wherein said feeding means and said discharge means include conduits extending into opposite ends of the dielectric.

6. Apparatus as set forth in claim 5 wherein said dielectric is provided with conduit-receiving plugs in said ends of the dielectric, and wherein said plugs are nonconductors of direct electric current.

7. Apparatus as set forth in claim 6 wherein is provided chambers between the plugs and the proximal ends of the inner electrode for receiving the cooling fluid.

8. Apparatus as set forth in claim 7 wherein the inner ends of the conduits are rigidly secured to the proximal ends of the inner electrode.

9. Apparatus as set forth in claim 8 wherein said inner ends of the conduits communicate with corresponding openings, each conduit having a partition and a hole on each side respectively of the partition thereof, said holes communicating with corresponding chambers.

10. Apparatus as set forth in claim 9 wherein is provided a sleeve in each chamber respectively rigidly secured to the proximal ends of the inner electrode, the plugs being within the sleeves.

11. Apparatus as set forth in claim 10 wherein each sleeve has a second plug therewithin, both being nonconductors of direct electric current, and both secured to the inner electrode.

12. Apparatus as set forth in claim 8 wherein said opening communicate directly with corresponding chambers.

References Cited

UNITED STATES PATENTS

| | | | |
|---|---|---|---|
| 1,183,753 | 5/1916 | Moody | 204—149 |
| 1,773,275 | 8/1930 | Neeley | 204—302 |
| 2,490,730 | 12/1949 | Dubiler | 204—149 |
| 3,202,601 | 8/1965 | Green | 204—302 |

FOREIGN PATENTS 606,154      1948    Great Britain.

TA-HSUNG TUNG, Primary Examiner

T. TUFARIELLO, Assistant Examiner